Patented July 13, 1937

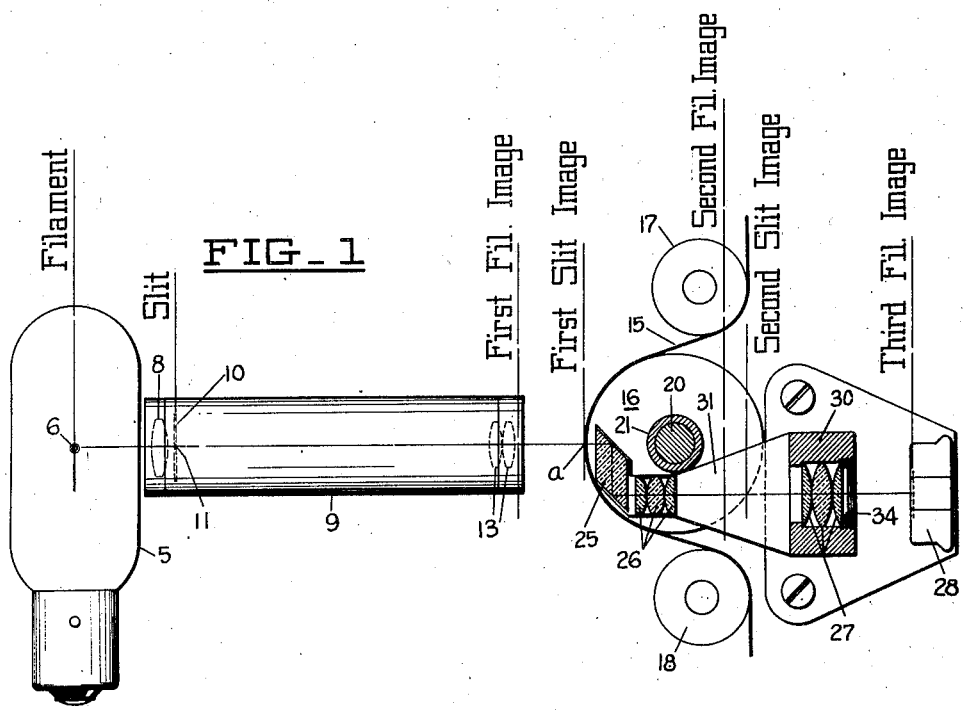
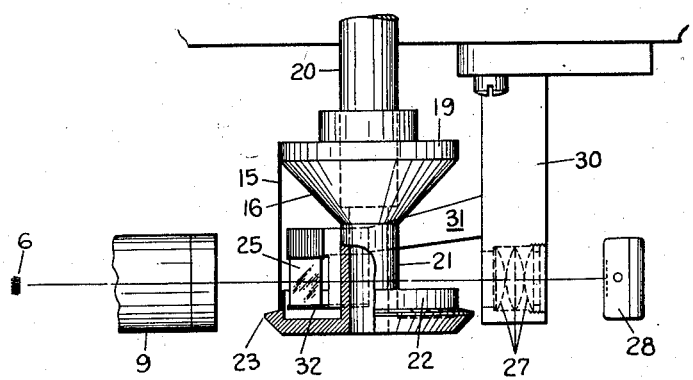

2,086,770

UNITED STATES PATENT OFFICE 2,086,770

SYSTEM FOR SOUND REPRODUCTION

Harold J. Hasbrouck, Jr., Flushing, N. Y., assignor to United Research Corporation, Long Island City, N. Y., a corporation of Delaware Application December 17, 1935, Serial No. 54,885

5 Claims. (Cl. 179—100.3)

This invention relates to the reproduction of sound from a record thereof and particularly from a diapositive film record whereby a constant intensity light beam defined by a slit and projected through the sound track portion of the film impinges upon a light sensitive device.

This general method of sound reproduction is well known in the art, the present invention being particularly directed to a system for improving the modulation of the light beam and the transition of the modulated light into electrical currents. There are also well known means for projecting a constant intensity light beam through the sound track, for advancing the film past the light beam, and for diverting the emergent light to the light sensitive device. The present invention, however, discloses a new and improved means for accomplishing these results. It utilizes a spool over which the film is advanced, one film supporting end of the spool being conical and the other film supporting end being a projection or overhanging rim. That is, the film is supported at its edges as it advances over a large portion of the circumference of the spool, thus stiffening the entire film and particularly at the sound track portion thereof.

A constant intensity beam is projected perpendicularly to the film or directly toward the shaft or axis of the spool. The modulated light rays emerging from the film are then conducted around the spool shaft to a light sensitive device. Since it is desirable from a practical standpoint to position the light sensitive device externally of the spool, an optical system having certain characteristics has been designed. Through imaging and reimaging the light source and the defining element known as the light slit, and making the light image planes out of focus with the slit image planes, variable intensity light in the light source image planes is obtained from variable width or variable area light in the slit planes. This feature is particularly advantageous as it permits variable intensity light to be projected on the light sensitive device thus producing a more efficient translation of light variations into electrical currents. This particular feature is disclosed and claimed in my copending application Serial No. 32,862, filed July 24, 1935.

The principal object of the present invention, therefore, is to more efficaciously and faithfully modulate a constant intensity light by a film sound track and translate the modulated beam into electrical currents. This is accomplished by novel means for supporting the film as it is advanced through the light beam and the novel optical system cooperating therewith. The details of the invention will be more readily understood by reference to the following description read in conjunction with the accompanying drawing, in which Fig. 1 is an elevational view of the essential elements of a sound reproducing system embodying the invention; and Fig. 2 is a plan view of a portion of Fig. 1 showing the film and optical supporting means.

Referring now to the figures, a lamp 5 having a filament 6 provides the light rays for transmission through a slit and lens assembly tube 9 which includes a condenser lens 8, a mask 10 having a slit 11 therein, and objective lenses 13. This slit and lens assembly may be any well known type. A film 15 having a sound track thereon is brought to and from a spool 16 in any suitable manner, the amount of contact between the film and spool being determined by guide rollers 17 and 18 which wrap the film over a considerable portion of the circumference of the spool. The spool 16 is mounted on a shaft 20 which may have a flywheel (not shown) mounted thereon to stabilize its rotation. The spool has a cylindrical portion 19 which is $\frac{5}{32}$ of an inch wide and 1⅜ inch in diameter. The portion 19 then tapers to a smaller diameter portion 21 of approximately ½ inch in diameter. The other end of the spool has an overhanging flange or rim 22 extending from a guide flange 23 which is slightly beveled, the flange 22 having the same diameter and width as that of portion 19 at the other end of the spool. These, of course, are the dimensions for one embodiment of the invention using 35 mm film. The portion 21 and the inside of the overhanging portion 22 may be painted black to eliminate light reflections.

The light is projected from the lens tube 9 perpendicularly to the film at a point $a$. The emergent light is then twice reflected by a rhomboid reflector 25 from which it is projected through a series of rectangular shaped lenses 26. These lenses are spherical in curvature but may be rectangular in shape, inasmuch as the rays defined by the slit are rectangular in shape. The light from the lenses 26 is then projected upon a light sensitive device 28, shown in the form of a selenium cell.

The rhomboid reflector is, of course, utilized for shifting the bundle of rays to another position in order to pass shaft 20 of the spool 16. The entire optical system comprising the rhomboid 25, lens 26 and lens 27 is supported by a bracket member 30 which may be attached to the frame of the machine. The member 30 has an extension 31 therefrom which has a recess or housing for the lenses 26 while the rhomboid is attached to one side of the arm 31 and maintained thereagainst by a metal plate 32 which is an extension of the casing for the lenses 26. The lenses 27 are fitted in an opening in the bracket 30 and maintained therein by a retaining ring 34. These lenses are spherical in curvature and may be circular in shape.

In the two views shown in the figures, it will be observed that the center ray of light from the filament 6 to the selenium cell 26 lies in a single vertical plane but in two horizontal planes, thus permitting perpendicular impingement of the light on the film 15 and perpendicular impingement of the light on the light sensitive device positioned away from the spool 16. From the legend shown in Fig. 1, a film image is formed adjacent the objective lenses 13 by the lens 8. This film image is again formed within the body of the spool 16 by lenses 26, and then again formed on a surface of the light sensitive material of selenium cell 28 by the lenses 27. The image of the slit, however, is formed by the lenses 13, first on the surface of the film and then in a position opposite the edge of the flange 22. The reimaging of the slit image is made in order to obtain all the light passing through the rhomboid 25 and the lenses 26, inasmuch as a portion of these elements underlie the flange 22. By thus reimaging the slit on the edge of the drum, the rays are narrowed at this point and all utilized for further projection to the light sensitive material.

Also, by the use of lenses 27 producing the light source or filament image planes out of focus with the slit image planes, the modulation of the light by a variable area sound track in shutter fashion, produces a variable intensity light on the light sensitive device. The effect of this type of optical projection of light is to produce a uniform translation of the light variations into electrical currents and prevent irregularities in the light sensitive surface from becoming noticeable. By the use of the above optical system, therefore, a constant intensity light defined by a slit is projected perpendicular to the sound track at a point where it is maintained in a single plane by the curvature of the film over the spool. Secondly, this light is conducted through the optical system in a manner to utilize all light emerging from the filament and is projected on the light sensitive device as a variable intensity beam.

In the case of a different type of light sensitive device, such as a caesium photo-electric cell being employed instead of the selenium cell 28, the two lenses shown at the right of the group 27 could be eliminated. This produces a larger light spot area comparable to the larger active surface of the caesium cell. However, by eliminating these lenses, the variable intensity feature is lost but this is not deleterious since the caesium cell surface is sufficiently uniform to permit the gain in surface area to be obtained.

What is claimed is:

1. An optical system for reproducing sound from a film sound track comprising a source of light rays, means for defining said rays to certain dimensions, a film, means for imaging said defining means on said film, means for imaging said source intermediate said image of said defining means and said defining means, means for forming a second image of said defining means modified by said film, said means also forming a second image of said source intermediate said second image of said defining means and said second imaging means, a light sensitive device and means for forming a third image of said source on said light sensitive device.

2. In a sound reproducing system, the combination of a film having a sound track portion thereon, a source of light rays, a light sensitive device, a hollow spool for maintaining said film at a predetermined position intermediate said source and said light sensitive device, a slit for defining said light beam, means for projecting in a plane passing through the axis of said spool an image of said slit on the sound track portion of said film, means for shifting the emergent light beams modulated by the sound track portion of said film to a different plane from that of said first plane, said different plane being parallel to said first plane and passing through said spool, and means for reimaging said slit at the circumference of said spool and said light source on said light sensitive device.

3. A sound reproducing system in accordance with claim 2 in which said means for maintaining said film at a predetermined position intermediate said light source and said light sensitive device includes a spool having ends for supporting said film at the edges thereof, one of said ends being tapered and the other of said ends being an overhanging flange.

4. An optical system for a sound reproducing system comprising a source of light rays, a spool having an inwardly overhanging flange and adapted to maintain a film in a predetermined lateral position, a slit for defining said light rays, a plurality of lenses for projecting an image of said slit perpendicularly to the sound track portion of said film, a reflecting device for shifting the light rays emerging from said film to a plane parallel with said plane of projection on said film, a plurality of lenses lying under the overhanging flange of said spool and immediately adjacent said deflecting device for reimaging said slit on the circumference of said spool for passing all the light emerging from said film and said lenses exteriorly of said spool, and a plurality of lenses external of said spool for reimaging said light source on a photo-sensitive device.

5. A system for modulating a constant light beam with the sound track portion of a film, a source of light, a light defining means, a spool for supporting said film along its edges in a predetermined position, said spool having an extension overhanging inwardly of said spool, optical means within the circumference of said extension and lying partially thereunder, and means for projecting an image of said light defining means perpendicularly onto the sound track portion of said film at a point of contact with said spool, said optical means forming an image of said slit at the circumference of said spool to pass substantially all of the emergent light projected on said film externally of said spool.

HAROLD J. HASBROUCK, Jr.